Dec. 30, 1947.   A. B. SCHULTZ   2,433,488
DEVICE FOR LAUNCHING AIRCRAFT OR OTHER BODIES INTO THE AIR
Filed Jan. 16, 1943   6 Sheets-Sheet 1

INVENTOR
ARTHUR B. SCHULTZ
BY
Robert M. Austin
ATTORNEY

Dec. 30, 1947.  A. B. SCHULTZ  2,433,488
DEVICE FOR LAUNCHING AIRCRAFT OR OTHER BODIES INTO THE AIR
Filed Jan. 16, 1943  6 Sheets-Sheet 2

INVENTOR
ARTHUR B. SCHULTZ
BY
Albert M. Austin
ATTORNEY

Dec. 30, 1947.  A. B. SCHULTZ  2,433,488
DEVICE FOR LAUNCHING AIRCRAFT OR OTHER BODIES INTO THE AIR
Filed Jan. 16, 1943  6 Sheets-Sheet 5

INVENTOR
ARTHUR B. SCHULTZ
BY
Albert M. Austin
ATTORNEY

Patented Dec. 30, 1947

2,433,488

UNITED STATES PATENT OFFICE 2,433,488

DEVICE FOR LAUNCHING AIRCRAFT OR OTHER BODIES INTO THE AIR

Arthur B. Schultz, Wilmington, Del., assignor to All American Aviation, Inc., Wilmington, Del., a corporation of Delaware Application January 16, 1943, Serial No. 472,600

21 Claims. (Cl. 244—63)

This invention relates to devices for launching aircraft or other bodies into the air and more particularly to an automatic winch for assisting in reducing the shock attendant in such operation.

An object of the invention is to provide an automatic winch for absorbing shock which will be simple in construction, dependable in operation and easily adjustable to meet the various conditions of operation.

According to a preferred form, the automatic winch comprises a rotatable drum and a rotatable brake support having a multiple disc brake acting therebetween. An electric motor may be connected through suitable reduction gearing to the brake support and an electromagnetic brake may be applied to the motor shaft, normally releasable when electric power is applied to the motor.

Manual adjustable devices having graduated indications may be provided for adjusting the maximum braking effort which will be applied to the drum for any launching operation. Other manual adjustable devices having suitable indicating markings may be provided for adjusting the number of revolutions which the drum may make to gradually apply the brake. Suitable brake resetting devices may also be provided for resetting the brake after a launching operation.

The brake adjusting means may take the form of a knurled knob projecting axially of the main winch shaft in a conveniently accessible position. The brake delay adjustment may take the form of an adjustable arm turning on a suitably marked dial located at the side of the winch, also in a conveniently accessible position. The resetting device which is also located in a conveniently accessible position may take the form of a simple crank.

If desired, a level wind may be provided for insuring smooth reeling in of the line on the drum. Provision may be made for cutting out the level wind during the launching operation. Safety devices may be provided for immediately releasing pressure on the main brake at any instant during a launching operation. A ratchet arrangement may also be provided for preventing accidental unwinding movement of the brake support during a launching operation. Emergency hand winding devices may also be provided for reeling in line in case the electric device fails.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Figure 1:
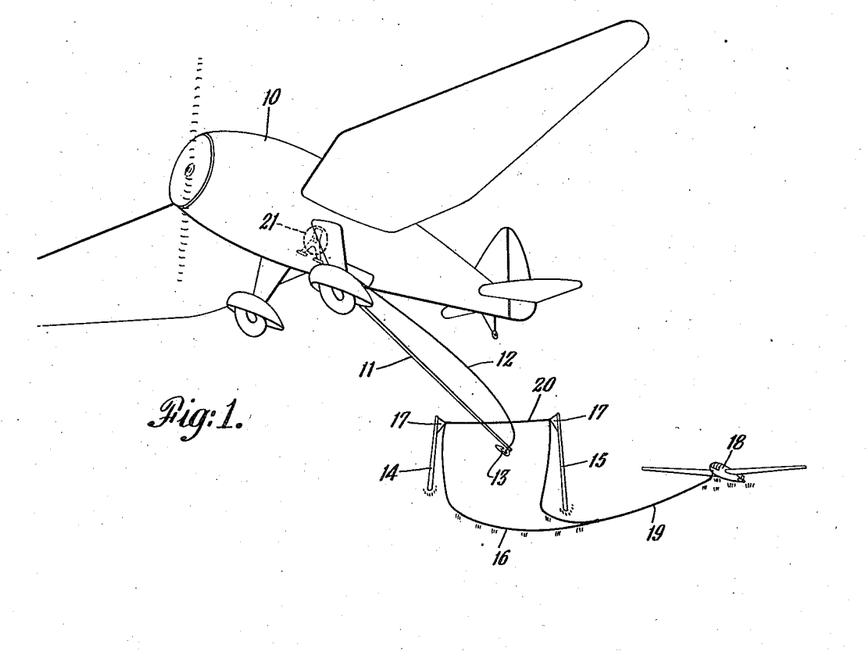
Fig. 1 is a diagrammatic perspective view illustrating one form of pick-up launching arrangement with which the invention may be used.
Figure 2:
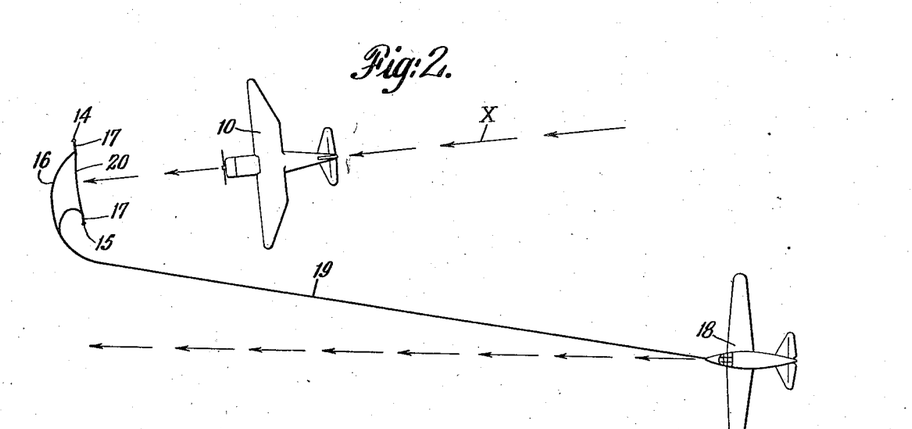
Fig. 2 is a plan diagram of Fig. 1.

There is shown diagrammatically one method of picking up a stationary glider by a plane in flight.

Referring now to Figs. 1 and 2, the tug plane is indicated by 10. This plane carries the winch 21 constructed according to my invention. The plane has a pick-up arm or pole 11 depending therefrom carrying at its lower end a hook 13. The hook is secured to a line or cable 12 which is wound on the winch 21.

The ground station comprises poles 14 and 15 set in the ground and carrying flags 17. The flags support a pick-up loop 16 connected to a lead or leader 19 which is connected to a glider 18 shown resting on the ground in back of the poles 14 and 15 and to one side, as illustrated in Fig. 2. The loop 16 is a closed loop and is suspended from the flags 17 by releasable connections, as will be understood by those skilled in the art.

For a more detailed description of the hook 13 and the manner in which it cooperates with the pick-up arm 11 and of the poles 14 and 15 and of the ground loop 16, attention is called to United States Patent 2,402,574 which is a division of United States Patent 2,373,414, and United States Patent 2,367,607, all in the name of Stuart Crosby Plummer.

Briefly, it will be understood that as the tug plane 10 passes over the ground station, the pole 11 which has been previously let down to a position somewhat as illustrated in Fig. 1, engages the upper ply 20 of the ground loop 16, this ply sliding down the pole and engaging the hook 13. The hook 13 automatically detaches from the end of the pole 11 and pulls the ground loop 16 free of its detachable connections to flags 17. The ground loop 16, lead 19 and the winch 21 cooperate to apply accelerating force to the glider 18 and thereby launch it with a minimum of shock. The exact manner in which this is done will be explained more in detail hereinafter.

Referring now to Figs. 3, 4, 5 and 6, the winch 21 comprises in general a frame 24 made up of side pieces 25 and 26 having legs suitably bolted to the floor or frame of the tug plane 10. The frame 24 also has a top cross piece 28 connecting the side pieces 25, 26 and supports a drive motor assembly 29. The winch 21 comprises a drum 32 on which the pick-up line 12 is wound, a brake support 33 frictionally engaging the drum 32 through a brake assembly indicated in general by 35. The brake support 33 carries a ring gear 34 through which the drum is controlled. It will be understood that the drum 32 rotates with the brake support 33 at times and at other times the drum 32 rotates with respect to the brake support 33, as will appear hereinafter.

Figures 3, 7:
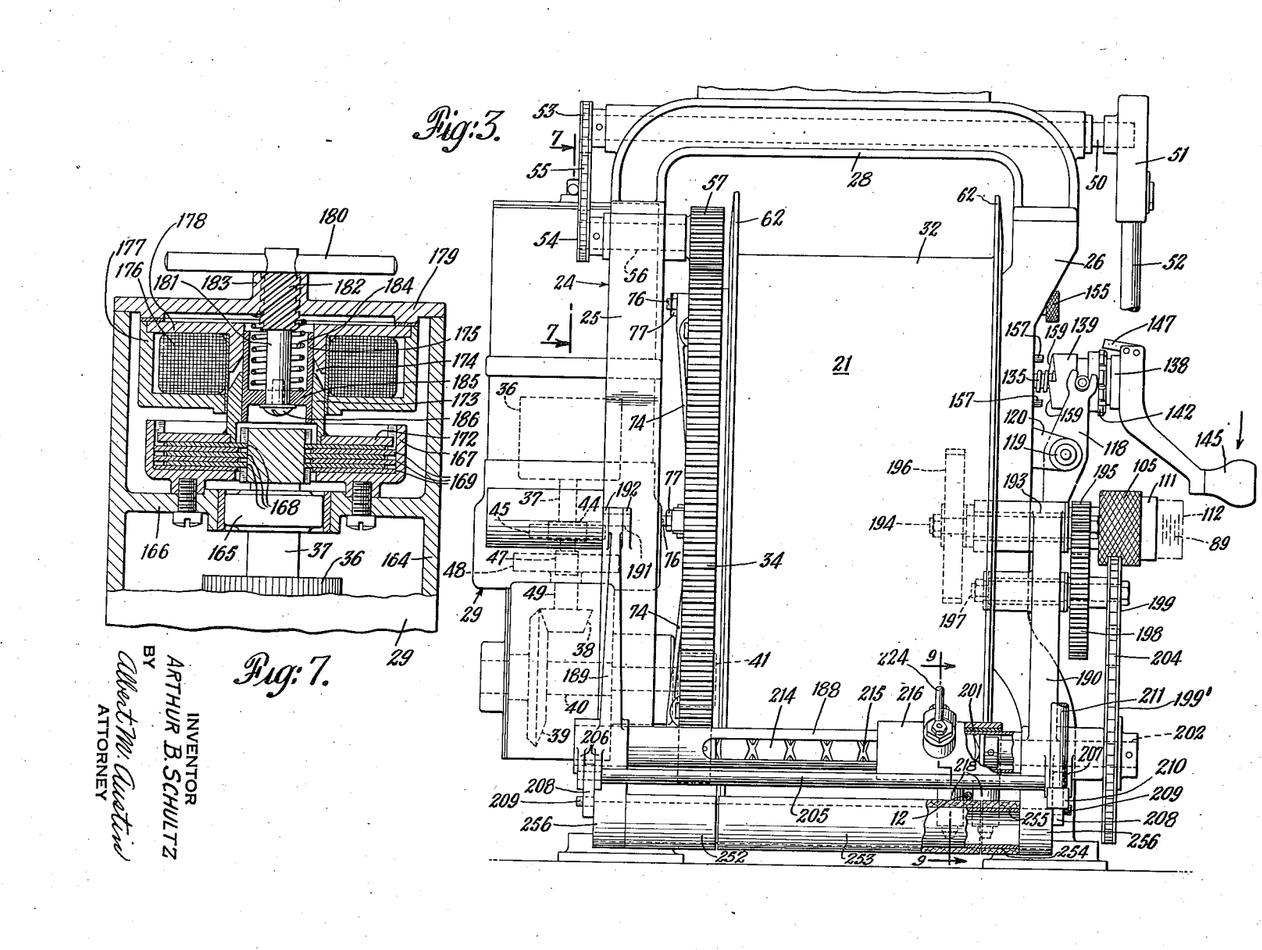
Fig. 3 is a rear end elevation of the winch according to the invention.
Fig. 7 is a fragmentary section taken through the motor and motor brake on the line 7—7 of Fig. 3.

Referring more particularly to Figs. 3 and 7, the motor drive 29 comprises an electric motor of suitable construction having an armature 36 and cooperating parts suitably mounted within the motor casing or frame 164 which is suitably bolted to the frame of the winch. The armature 36 is mounted upon a shaft 37 which carries pinion 44. Pinion 44 meshes gear 45 mounted upon an auxiliary shaft which also carries pinion 47. Pinion 47 drives gear 48 mounted upon shaft 49 on which is also mounted bevel gear 38. Bevel gear 38 meshes bevel gear 39 mounted upon shaft 40 suitably journaled in the motor frame on which is also mounted pinion 41 meshing ring gear 34. Thus the electric motor under control of a suitable switch, not shown, may drive the winch through the reduction gearing just described.

In case of emergency, the winch may also be driven by hand. The hand drive comprises a shaft 50 journaled in the top cross piece 28 of the frame. One end of the shaft carries a detachable ratchet device indicated by 51 having a handle 52 which, when reciprocated back and forth, will rotate shaft 50 in one direction. In place of the ratchet arrangement 51, 52, a simple detachable crank may be used depending upon the particular plane on which the winch is mounted. The other end of shaft 50 carries a sprocket 53, Fig. 4, driving chain 55 which in turn drives a sprocket 54 mounted upon shaft 56 suitably journaled in the side piece 25. Shaft 56 carries a pinion 57 which meshes ring gear 34.

The hand ratchet 51, 52 (or crank) must be detached from the shaft 50 after each use and applied to shaft 50 only for hand driving. The ratchet 51, 52 will, of course, rotate the shaft 50 in either direction depending upon which face of the ratchet is slipped on the shaft first.

Figures 6, 15:
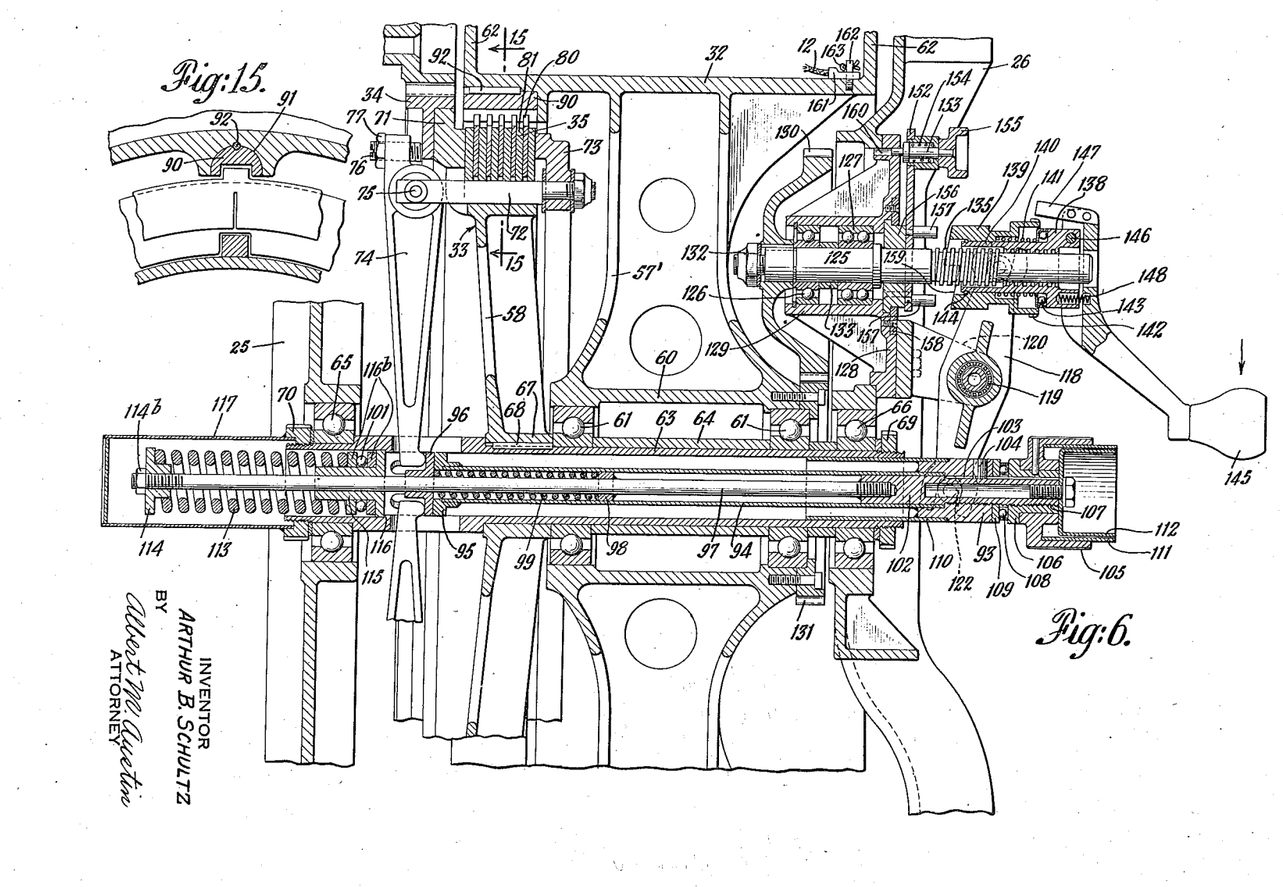
Fig. 6 is an enlarged fragmentary section taken through the axis of the main shaft and counter-shaft of the winch taken on the line 6—6 of Fig. 5.
Fig. 15 is a detail showing how the brake discs are mounted in the drum, taken on the line 15—15 of Fig. 6.

Referring now also to Fig. 6 for a description of the main brake mechanism, the drum 32 has side flanges 62, spokes 57' and a hub 60 journaled on main shaft 63 through ball bearings 61, a spacing sleeve 64 being located between the bearings 61. The main shaft 63 is journaled in ball bearings 65 and 66 located respectively in the side pieces 25 and 26. The main shaft 63 has suitable end nut arrangements 69 and 70 for holding it axially.

The brake support 33 has spokes 58 and a hub 67 suitably keyed to main shaft 63 by key 68. The spokes 58 are secured to a rim 71 to which the ring gear 34 is suitably attached. Rods 72 suitably anchored in pressure plate 73 pass through alternate notches 84 in discs 81 and through notches in rim 71. Brake levers 74 are supported at the ends of rods 72 by pivot pins 75. The brake levers 74 carry adjusting set screws 76 having lock nuts 77 for adjusting the brake pressure during assembly.

Figures 11, 12, 13, 14:
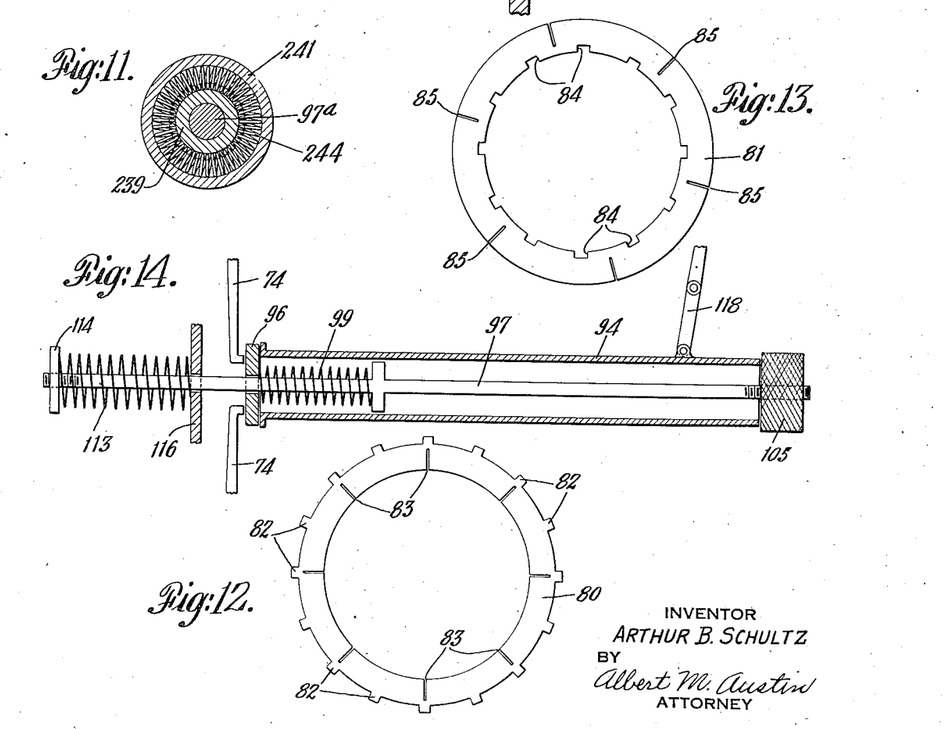
Fig. 11 is a section on the line 11—11 of Fig. 10 illustrating the construction of the expansible spring ring.
Figs. 12 and 13 are plan views on a reduced scale of the brake discs used in the main brake.
Fig. 14 illustrates diagrammatically the method of operation of the main brake spring.

Secured to the drum 32 and to the rim 71 are a series of brake discs 80 and 81 sandwiched together. These brake discs are shown in Figs. 12 and 13. The discs 80 are called for convenience of description the "outer" discs and the discs 81 will be called the "inner" discs. The outer discs 80 have a series of tongues 82 by which they are keyed to the drum. The inner discs 81 are keyed to the rim 71 by inner notches 84. Both discs 80 and 81 may be made of steel, the inner discs 81 having special frictional composition surfaces. Saw cuts 83 and 85 in discs 80 and 81 are for the purpose of permitting expansion of the discs without warping under braking temperatures.

Figures 4, 8, 16:
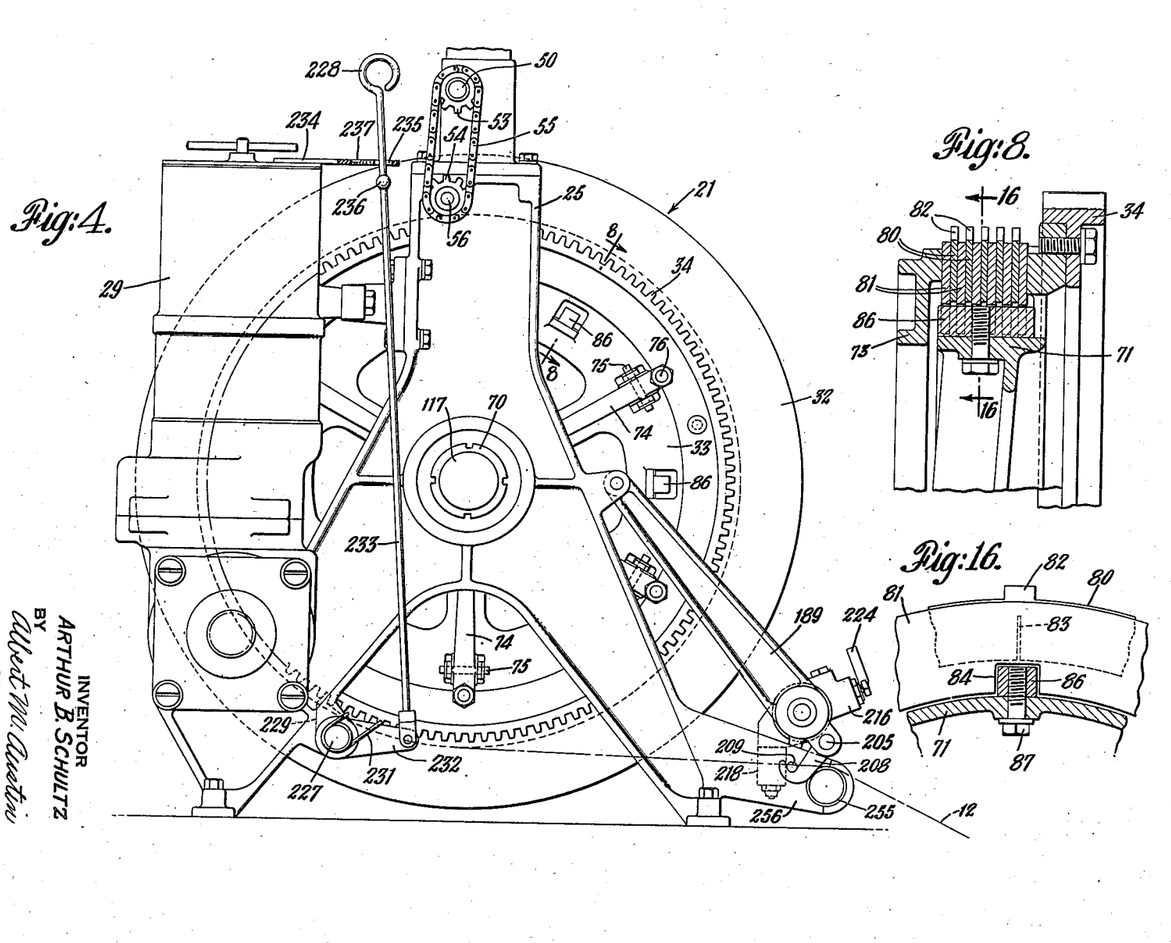
Fig. 4 is a side elevation of the winch, as seen from the left side of the plane.
Fig. 8 is a detail section illustrating the main brake as distinguished from the motor brake taken on the line 8—8 of Fig. 4.
Fig. 16 is a detail showing how the brake discs are mounted upon the brake support rim, taken on the line 16—16 of Fig. 8.

The inner discs 81 are keyed to rim 71, Figs. 8, 16, by a series of bars 86 bolted to the rim by bolts 87. These bars constitute keys which fit into the notches 84 of the discs 81, and on which the discs 81 are free to move axially.

Referring now to Fig. 15, the outer discs 80 are attached to the drum 32 by a series of U-shaped channels 91 integral with the drum, in which fit U-shaped keyways 90. The keyways 90 are made from round stock and snugly fit the cylindrical side walls of the channels 91, which walls extend somewhat more than 180° in circumference to hold the keyways in place. The keys 90 are held in place by dowel pins 92. The tongues 82 of the discs 80 slidably rest in the channels of keyways 90.

It will be understood that one of the reasons for the special constructions for attaching the brake discs to their respective members is that the rim 71 and the drum 32 are made of special light metal and that the extra bars 86 and keys 90 are made of wear resisting material to withstand the wear caused by the brake torque applied to the discs and by the axial shifting of the discs as the brake is applied.

It will be understood from the above description of the main brake mechanism that if the brake fingers 74 are moved to the left in Fig. 6, the pressure applied by set screws 76 to ring gear 34 and the pull exerted on pressure plate 73 by rods 72 cause all of the brake discs to be pressed firmly together throughout their entire effective areas causing a braking or clutching action between the brake support 33 and drum 32, and that when the fingers 74 are moved to the right in Fig. 6, this braking pressure will be released, permitting relatively free movement of the drum 32 with respect to brake support 33.

The mechanism for operating the brake fingers 74 constitutes a brake tube assembly and a brake rod assembly mounted within the main shaft 63. The brake tube assembly comprises a coupling 93 secured to tube 94 which is secured to a flange or plate 95 adapted to abut a slidable or floating disc 96 to apply pressure to the ends of brake fingers or levers 74. A guide tube 110 is secured to coupling 93 which slides within the end of main shaft 63. The brake rod assembly comprises a rod 97 having a collar 98 secured thereto, a spring 99 operating between the collar 98 and floating disc 96. Secured to rod 97 is a fitting 102 having a keyway 103 in which slides a pin 104 secured to collar 93. The fitting 102 is slidable in sleeve 94 and collar 93.

For providing adjustable connection between the brake tube assembly and the brake rod assembly, a knurled adjusting nut 105 is pinned to a liner 106 having screw thread engagement 107 with fitting 102, and an annular ball bearing 108 is disposed between liner 106 and washer 109 for communicating pressure between these members and to facilitate turning of knurled nut 105 for varying the pressure of the main spring 113.

Main spring 113 abuts a nut 114 threaded to the end of rod 97 and secured by a lock nut 114b. A flanged sleeve 115 engages a shoulder 116 on main shaft 63 and an annular ball bearing 101 is interposed between two hardened washers or bearing races 116b which abut the main spring 113 and sleeve 115. A protecting tube 117 is secured to nut 70 for housing and protecting the main spring 113.

Referring now also to Fig. 14, the manner in which the main brake spring 113 applies pressure to the brake fingers 74 will be described. This figure is added to facilitate understanding of the operation of the rod and tube assemblies and illustrates diagrammatically the manner in which these assemblies adjust and control the pressure of the main brake spring 113 on the brake fingers 74. Members having corresponding functions are indicated by the same reference characters. It will be seen that the main brake spring 113 acting against abutment 116 exerts a force on rod 97 to the left which exerts a pressure through nut 105 to tube 94 which communicates this pressure to the brake fingers 74 to put on the brake.

It is obvious that the farther nut 105 is screwed on rod 97, the more pressure main brake spring 113 will apply to brake fingers 74. It will also be apparent that if the tube 94 is moved to the right out of contact with floating disc 96, pressure of the main brake spring on brake fingers 74 would be removed. It will be noted that irrespective of the position of tube 94, and nut 105, some pressure is always exerted by spring 99 on the brake fingers 74. This pressure provides a small initial pressure on the main brake assembly for a reason pointed out hereinafter more in detail.

Referring now also to Figs. 3 and 6, the knurled adjusting nut 105 has indicating devices associated therewith for indicating the maximum operating brake pressure to which it is desired to set the main brake for any particular operation. For this purpose, a cup-shaped member 112 is secured to the fitting 102 of the brake rod assembly by a bolt 100 and a sleeve 111 is secured to the knurled nut 105. The cup 112 has suitable graduations 89 thereon, as illustrated more particularly in Fig. 3. By turning nut 105 the edge of sleeve 111 may be made to register with one of the graduations on cup 112 corresponding to the brake pressure for which it is desired to set the winch for the particular pick-up operation it has to perform.

For controlling the movement of the brake rod and brake sleeve assemblies automatically for a pick-up operation, an automatic brake control mechanism is provided. This mechanism constitutes a two part or double yoke 118 (see also Fig. 5) suitably fulcrumed through a bearing 119 to a bracket 120 attached to the side piece 26. The lower ends of the yoke 118 are bifurcated and slidably engage needle bearings on studs 122 secured to collar 93. Thus, by moving yoke 118, the entire brake rod and brake tube assembly may be moved axially to control the main brake.

For operating the yoke 118, a counter-shaft and brake operating nut mechanism are provided. A housing comprising a special dial plate 128 is suitably bolted to the side piece 26 and carries a bearing tube 129. Secured within the bearing tube are bearing assemblies 126 and 127 separated by spacer 133. These bearing assemblies carry counter-shaft 125 which has secured thereto a gear 130 by suitable key and nut devices indicated in general by 132. Counter-shaft gear 130 is driven by gear 131 bolted to the hub 60 of the drum 32.

The counter-shaft 125 has acme machine threads 135 intermediate its length and cooperating therewith is a composite nut member 138. Nut 138 comprises an outer and non-rotatable sleeve 139 and a telescoping inner and rotatable sleeve 140 having a spring 141 acting therebetween against a ball bearing 143. A snap ring 144 is set in a groove in inner sleeve 140 to prevent separation of the sleeves. The inner sleeve 140, which is the nut proper, carries screw threads adapted to engage and to run off of the screw threads 135.

For setting the brake operating nut 138, a crank handle 145 is provided, this handle being pivoted to inner sleeve member 140 by pivot pin 146. Handle 145 carries a finger 147 adapted to seat between lugs 142 on the outer sleeve 139. A spring 148 resting in seats in the hub of crank 145 and in the end of inner sleeve 140 normally urges the crank finger 147 between certain of the lugs 142 to prevent relative rotation between the inner and outer sleeves of the brake operating nut 138. The handle 145 is shown depressed by the operator of the winch in Fig. 6 in a position for setting the brake operating nut as will be described more in detail hereinafter.

Cooperating with the brake operating nut 138 is a brake delay mechanism for adjusting the number of turns the drum may make in a pick-up operation before the main brake is fully applied. This mechanism comprises an arm 152 cooperating with the dial plate 128. The arm 152 is secured to a hub member 156 rotatably mounted in dial plate 128 and held in position by a split ring 158. A spring pressed pin 153 controlled by a knob 155 is mounted in the end of arm 152. The spring 154 acting between a flanged sleeve on the dial arm 152 and a shoulder on the pin 153 urges pin 153 into one of a series of holes 160 in dial plate 128. These holes may be identified by letters A to E (see Fig. 5).

Secured to the dial arm 152 are two pins 157 which cooperate with cam surfaces 159 on the end of outer brake nut sleeve 139. The functions of the adjustable dial arm 152 and of the brake operating nut will be apparent from the following explanation.

It will be understood that, during a pick-up operation, after the nut proper 140 runs off of the machine threads 135, the main spring 113 is then free to act to exert pressure on the brake levers 74 to apply the main brake. Since the counter-shaft 125 rotates whenever drum 32 rotates, the spring 141 is provided for maintaining a slight clearance between the threads on the nut proper 140 and the threads 135 on counter-shaft 125 after these threads disengage, to prevent damage thereto.

To set the brake delay adjustment, the knob 155 is pulled out so that pin 153 may be set in one of the holes A to E corresponding to the number of revolutions it is desired the drum 32 to make before fully applying the main brake. The handle 145 is then depressed to the position shown in Fig. 6 and pushed axially to engage the threads of the nut and counter-shaft. The axial movement of inner sleeve 140 compresses the spring 141 causing the ball bearing 143 to engage the adjacent shoulder on the outer sleeve 139. The handle 145 is then turned counter-clockwise until the cam surfaces 159 abut the pins 157. The handle 145 is then turned slightly, if necessary, to bring crank finger 147 into register between two adjacent lugs 142, and then released to thereby lock the inner and outer sleeves of the composite brake operating nut 138 together.

Thus it will be seen that the brake operating nut is screwed along the threads 135 and the position of pins 157 in cooperation with the cam surfaces 159 will determine the inner axial position of the nut 138. When the drum 32 rotates during the pick-up operation, the movement of the counter-shaft 125 will cause the inner sleeve of brake operating nut 138 to move to the right in Fig. 6 until the threads disengage. It will be understood that the main brake spring 113 acts to urge the nut to the right in Fig. 6 and that, slightly before the nut threads disengage the counter-shaft threads, the main brake becomes fully applied. Further displacement of the composite nut 138 is prevented by snap ring 144 and the yoke 118.

It will be understood that the crank finger 147 retains its position between lugs 142 and is only removed therefrom by hand pressure on the adjusting crank 145. It will be understood that the locking of nut sleeves 139, 140 by finger 147 prevents the nut proper 140 from turning with shaft 125 when a pick-up is made.

It will be understood that the line 12 is wound upon the drum 32, the length of line depending upon the size of the drum. The inner end of the line 12 is secured to the drum by a safety device which comprises an apertured fitting 161 which fits over a stud 162 secured to the drum near one side thereof. The fitting 161 is retained on the stud by a suitable cotter pin 163. The stud 162 and fitting 161 are mechanically strong and will withstand all of the tangential force exerted by the line 12 that is necessary for the pick-up operation. This is desirable since with steel line there is comparatively small snubbing action between the convolutions thereof and considerable stress may be imparted to the stud 162 tangentially of the drum, particularly when a relatively few convolutions of line remain on the drum. The cotter pin 163 is made relatively weak so that, in the event the line 12 is completely unwound from the drum and the line exerts radial pull on the drum, the cotter pin 163 will shear readily, allowing the line 12 to completely disengage itself from the drum, thus providing a safety measure preventing damage to the mechanism in the event that an improper adjustment is made.

In addition to the main brake which operates between the brake support 33 and drum 32, there is provided a motor brake. The motor brake is for the purpose of braking the brake support 33. Referring to Fig. 7, the motor shaft 37 is shown located in a ball bearing 165 housed in a flange 166 forming part of the casing or frame 164. Secured to flange 166 is a brake support 167 housing a series of brake discs 168, 169 over which is disposed a pressure plate 172. The alternate brake discs 169 and the pressure plate 172 have peripheral tongues slidable vertically in grooves located in the brake support 167. The alternate brake discs 168 have similar tongues which fit in axial grooves in the motor shaft 37, as will be understood by those skilled in the art. Thus, when there is no pressure on the brake discs, the motor shaft 37 is free to turn. When pressure is exerted on the brake discs, motor shaft 37 is held stationary.

The motor brake is operated magnetically by a suitable electromagnet. The brake is normally held applied by means hereinafter described and the electromagnet and the motor are so wired that when electric power is applied to the motor, it is automatically applied to the electromagnet which releases the motor brake.

The electromagnet comprises a magnet coil 176 held between flanged collars or rings 177 and 178 suitably clamped to the cover 179 of the casing 164. Secured to pressure plate 172 is a sleeve 173 and secured to sleeve 173 is a sleeve 175, these sleeves having an axial movement against the pressure exerted by spring 184 acting between cover 179 and flange 185. Thus the spring 184 is available to exert pressure on the brake discs.

When electric power is applied to magnet coil 176, the magnetic circuit which comprises iron collars 177, 178 and iron tube 172 causes an upward movement of tube 173 to close the air gap 174, thus compressing spring 184 and relieving pressure from the brake discs.

In case it is desired to release the motor brake manually either because of failure of the electromagnet or for other reasons, a hand release is provided. The hand release comprises a spindle 181 having a hand bar 180 and having steep screw thread engagement 182 with a hub 183 on cover 179. The spindle 181 has a shank passing through flange 185 and a screw 186 is threaded into the shank to provide a shoulder engaging flange 185. Thus by rotation of the handle bar 180, the tubes 173 and 175 and pressure plate 172 may be raised to release the motor brake. It will be understood that the tube 175 will be made of some non-magnetic material so as not to interfere with the magnetic circuit of the electromagnet.

For insuring the winding of the line on the drum in smooth layers, a special level wind device may be provided with arrangement for cutting it out if desired. The level wind is shown best in Figs. 3, 4 and 5.

Figures 5, 9:
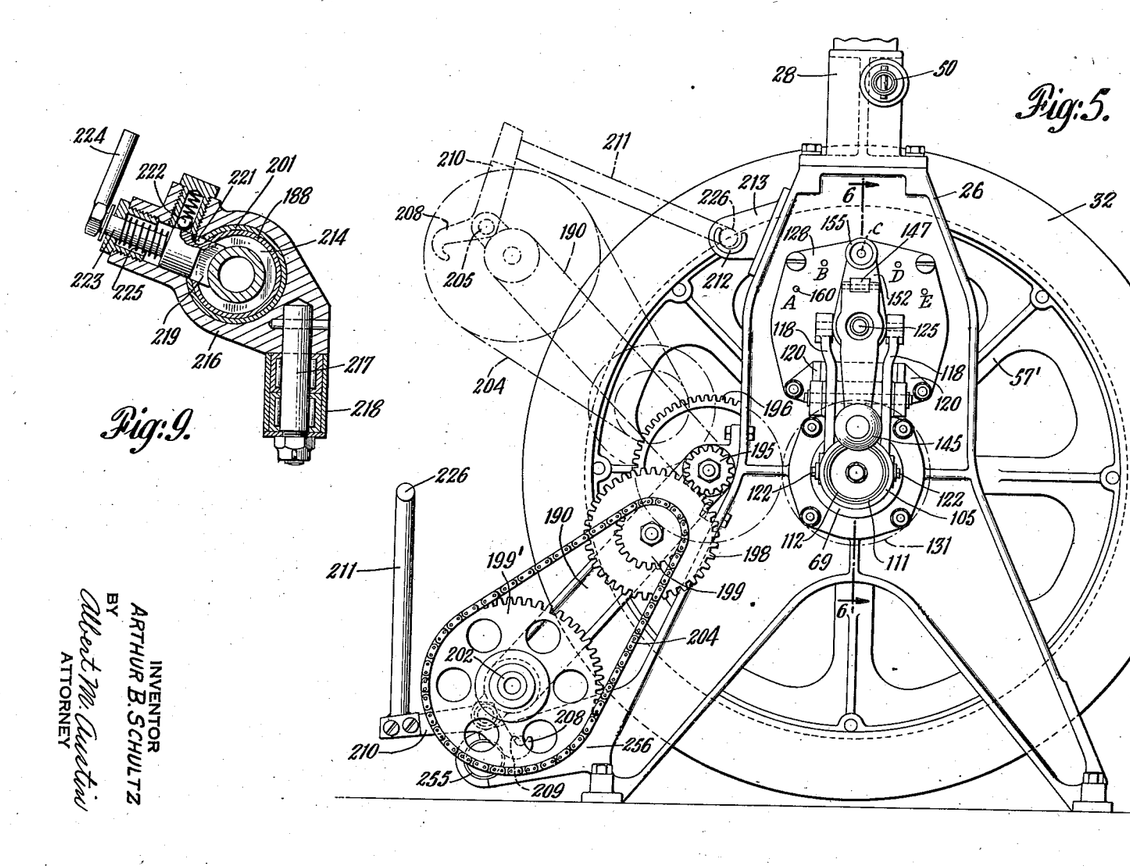
Fig. 5 is a side elevation of the winch, as seen from the right side of the plane.
Fig. 9 is a section taken on the line 9—9 of Fig. 3 through the traveler of the level wind.

The level wind comprises a tube 188 affixed to arms 189, 190. The arm 189 is pivoted to suitable flanges 192 on the side piece 25 through pivot 191. The arm 190 is journaled on sleeve 193 secured to side piece 26. For driving the level wind, a shaft 194 is journaled in the side piece 26 and passes concentrically through the sleeve 193. Shaft 194 supports a gear 196 meshing with gear 131 secured to the drum 32.

Shaft 194 supports overhanging gear 195 which meshes a gear 198 affixed to stud shaft 197 journaled in arm 190. Gear 198 is secured to sprocket 199 which drives chain 204 which rides on a large sprocket 199' secured to shaft 202 which is secured to the rotating drum 214 of the level wind.

The drum 214 has the usual intersecting helical grooves 215 for driving the carrier or traveler 216 back and forth. The traveler 216 (Fig. 9) has a bushing 201 sliding upon fixed tube 188 and supports a flat tongue member 219 which rides in the grooves 215. The tongue member 219 has a cylindrical portion provided with a circular groove 221 cooperating with a spring pressed ball 222. A shank 223 and handle 224 are provided, and a spring 225 is also provided for resiliently holding the flat nose 219 in the grooves 215.

The flat nose 219 may be entirely disengaged from the helical grooves 215 by pulling out handle 224 against pressure of spring 225. The nose 219 may be held disengaged by causing spring pressed ball 222 to engage groove 221. Thus the traveler may be slid manually along the length of tube 188. It will be noted that the stationary tube 188 has a slot through which the flat nose 219 projects.

Depending from the traveler 216 are spaced shanks 217 supporting ball bearing rollers 218 between which the line 12 passes. The space between the rollers 218 is open at the bottom so that the entire level wind may be lifted out of the way. The line 12 passes over a series of fibre rollers indicated by 252, 253 and 254 located on shaft 255 which is secured to brackets 256 supported by the side pieces 25 and 26.

For locking the level wind in lower operative position, a rod 205 is journaled in flanges 206 and 207 secured to the ends of arms 189, 190. Secured to shaft 205 are hooks 208 engageable with pins 209 secured to the frame brackets 256. One of the hooks 208 has an arm 210 to which is secured a rod 211 having a handle 226.

In Fig. 5 the level wind is shown in operative position with the hooks 208 engaged under the pins 209. To cut out the level wind, it is only necessary to lift handle 226 which disengages hooks 208 and swings the entire level wind upwardly. A bracket 213 having a seat 212 is secured to the winch frame for receiving handle 226 to hold the level wind in inoperative position.

To prevent accidental unwinding movement of the brake support 33, a ratchet arrangement is provided (see Fig. 4). This comprises a pawl 229 and the teeth of ring gear 34. The pawl is mounted upon a shaft 227 journaled in a bracket secured to the frame. Shaft 227 has an arm 232. A spring 231 urges the pawl 229 in engaged position.

To disengage pawl 229, a rod 233 is pivoted to arm 232 and slides in a holder plate 234 bolted to the motor assembly 29. Plate 234 has a keyhole slot comprising a large opening 235, through which ball 236 on rod 233 will pass, and a smaller passage ending in a seat 237 in which ball 236 rests when handle 228 is raised and swung to the left in Fig. 4 to disengage pawl 229. It will be understood that, when the pawl 229 is disengaged, the ring gear 34 may be driven or moved in either direction. When the pawl 229 is engaged, the ring gear 34 may be moved only in such direction as to wind up the line 12 on the drum.

Figure 10:
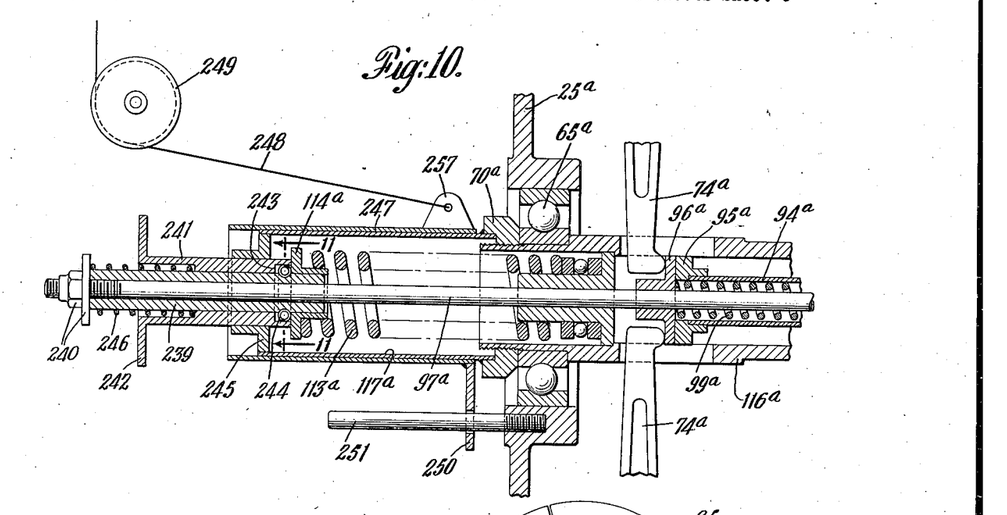
Fig. 10 is a fragmentary section through the main shaft of a modified form of winch illustrating an emergency line release.

In some cases during a pick-up operation if something goes wrong, it is desirable to have a device for immediately releasing all drag on the line 12 as it unwinds from the drum. In Fig. 10 such a device is shown for immediately removing tension from the main brake spring and thereby releasing the main brake.

The mechanism in Fig. 10 is applied to the end of the main shaft and corresponding parts are indicated by the same reference characters as in Fig. 6 followed by the letter a. In Fig. 10 a sleeve 239 surrounds rod 97a and is prevented from endwise movement by a nut and washer indicated by 240. An expansible spring made up of a helical coil bent in the form of a ring and indicated by 244, seats in a groove in sleeve 239. The washer 244 is retained in this groove by a holding sleeve 241 having a recess 243 in which the washer 244 seats. The plate 114a which withstands the pressure of main spring 113a abuts the spring washer 244. A spring 246 acts between abutment 240 and control sleeve 241 to hold the latter in position to retain the spring washer 244 in its groove and seat.

The nut 70a has a guide tube 117a secured thereto supporting a collar 245 which slidably supports the control sleeve 241. An operating sleeve 247 slides on the outside of protecting sleeve 117a and has an apertured ear 250 slidable on stud 251 secured to the adjacent winch frame. Operating sleeve 247 also has an ear 257 to which an operating line 248 is secured. This line 248 may pass over suitable pulleys, one of which is indicated by 249 to a position convenient to the operator of the winch.

The operation of this safety release is as follows: Normally, the main spring 113a plays its usual function in applying the main brake. If an emergency arises, the operator pulls cord 248 causing operating sleeve 247 to engage flange 242 on holding sleeve 241. This causes the latter to move to the left in Fig. 10 against tension of spring 246 releasing radial pressure on spring washer 244 which permits this washer to expand and depart from the groove in which it seats in sleeve 239. This removes the abutment against which spring pressed collar 114a rests and immediately releases the main brake spring 113a, thus releasing the main brake and permitting the drum freely to unwind.

The material and various parts of the winch will be made of as light metal as possible, steel or other heavier materials being used only where necessary to withstand heavy stresses or heavy wear. The pick-up line wound on the drum may be made conveniently of flexible steel cable. This material is economical in the space it occupies on the drum and the size of the drum and hence its moment of inertia may be kept down as low as possible.

The material of the pick-up loop 16 and of the lead line 19 may be nylon or some other plastic or similar material having functional properties of nylon, as for example, vinylidene, vinyl chloride, rayon, etc. Such material should have high tensile strength, high elasticity, high percentage elongation and relatively slow return to original length when stretched. The elongation permits yield in the line to give sufficient time for the drum to get up to speed. The property of relatively slow return to normal length after stretching is sometimes referred to as long elastic memory. This absorption of energy prevents all rebound or overshooting which would occur if ordinary elastic cord having a quick return were used. At the same time, the high elasticity of nylon or similar material causes return to normal length after stretching quickly enough to make another pick-up a few minutes after the previous pick-up.

*Operation*

The operation of the winch will be described in connection with a typical pick-up operation. Referring now to Figs. 1 and 2, the ground loop 16 will be secured to the releasable couplings and the lead 19 laid out on the ground and secured to the nose of the glider 18, as illustrated. The position of the glider 18 with respect to the poles 14 and 15 will be somewhat as illustrated in Fig. 2.

The tow plane is preferably provided with a pick-up operator in addition to the pilot. The path of the tow plane is indicated by the arrow X. Before approaching the ground station the pick-up operator gets his apparatus in readiness for the pick-up operation. He slides the hook 13 down to the end of pick-up arm 11 to the position indicated in Fig. 1, paying out sufficient line 12 off the reel. This line may be paid out by pulling the line by hand with the drum rotating in spite of the initial friction applied by the main brake. Or, if this initial friction is too high for convenient paying out by hand, he may drive the electric motor slowly in such direction or rotate the hand ratchet handle 52 in such direction as to pay out line 12, in which event he must be certain to raise ratchet handle 228 to disengage ratchet pawl 229. After paying out the desired amount of line 12, he will move the ratchet handle 228 to release enlargement 236 from locking plate 234 permitting engagement of the ratchet pawl.

The pick-up operator then adjusts the brake delay by placing pin 153 in any hole, A to E, Figs. 5 and 6, depending upon the amount of brake delay he desires. He adjusts the knurled knob 105 to give the desired maximum brake pressure according to the proper marking on sleeve 112. He raises the level wind, hooking the handle 226 in its holder 212. He resets the brake operating nut 138 by depressing hand crank 145, pressing inwardly and turning it counter-clockwise until the cam surfaces 159 snugly abut the pins 157.

The initial light friction applied to the main brake by auxiliary spring 99 prevents the wind drag on line 12, when the pick-up hook 13 is at the lower end of the pick-up arm 11, from unwinding the line from the drum.

All of the parts of the pick-up apparatus now being adjusted to proper position, the pilot of the tug 10 flies sufficiently close to the ground to engage the upper ply 20 of the ground loop by the pick-up pole 11, as indicated in Fig. 1. The upper ply 20 slides along pick-up pole 11 engaging hook 13 which disengages itself from the end of the pole 11 and immediately puts tension on pick-up line 12. The tug pilot should begin to climb as soon as contact is made. The glider pilot must get the glider into the air as soon as possible and he should continue to climb until flying altitude is attained.

Upon tension being applied to pick-up line 12, the drum 32 rotates relatively freely under light tension applied by the main brake, the brake operating nut 138 immediately moving to the right in Fig. 6. After the desired number of revolutions of the drum 32, the flange 95 of the brake tube assembly contacts the plate 96, putting pressure on the brake levers 74 which gradually applies the main brake as the nut 138 continues to move to the right in Fig. 6. Just before the inner sleeve 140 of the nut 138 entirely disengages the screwthreads 135, the main brake is full on, the main spring 113 being entirely free to act and the brake nut spring 141 keeps the inner sleeve 140 of the brake nut 138 clear of the shaft threads 135 to prevent damage since the drum 32, together with counter-shaft 125, will continue to rotate until the glider 18 is completely accelerated.

The drum 32 will continue to rotate under the retarding effect of the main brake, paying out line 12, until the glider is brought to the same speed as the tug. After this, the winch operator may reel in the line 12 or he may continue to tow the glider 18 without reeling in any line. To reel in line 12, the operator lowers the level wind first, then starts the electric motor 29, or he may reel it in by operating the hand ratchet 52.

The action of the winch and of the steel pick-up line 12 and plastic ground loop 16 and plastic lead line 19 upon the glider is as follows: At the moment of impact of the hook with the ground loop, the tug plane may be traveling 120 miles an hour and it is desired to accelerate the glider from zero velocity to the velocity of the plane with as little shock on the plane, glider, equipment and personnel as possible. It is preferable to keep the acceleration of the glider down to one g, (32 feet per second per second) or less. The elongation of the synthetic rope and the paying out of the winch cooperate to this end.

Upon the first force being applied to the pick-up line 12, which may be considerable due to the high speed of the tug plane, the pick-up line together with ground lines exert an accelerating force on the winch. The relatively great elongation of the plastic material provides this force but gives sufficient time to overcome the inertia of the drum and start it rotating. The relatively light braking effort applied to the drum during its initial rotation cooperates to this end. After the drum is accelerated, the main brake is gradually applied to prevent too rapid paying out of the steel cable 12 and to apply the constant accelerating force to the glider. The continued paying out of the line, even after the main brake is fully applied, limits the accelerating force applied by the pick-up equipment to a safe value.

It will be seen that with any setting of the set screws 76, the position of the washer 95 on the tube 94 is determined only by the position of the composite brake operating nut 138 and is independent of the adjusted position of the knurled knob 105. For example, with the brake delay arm 152 adjusted to give maximum brake delay, permitting positioning of the composite nut member 138 farthest to the left in Figure 6, the drum 32 may make about one turn before the washer 95 engages the floating disc 96 and begins to actuate the brake levers 74; after the disc 96 begins to actuate levers 74, the drum may make eight revolutions before the main brake is fully applied. On the other hand, with minimum brake delay, the washer 95 may engage floating disc 96 and thus apply pressure to the brake lever 74 before the drum 32 starts to rotate and the drum will make a corresponding lesser number of revolutions before the main brake is fully applied.

In either case, the composite brake operating nut 138 holds back the action of the main brake spring 113, permitting its force to be applied to the main brake gradually. Thus, before, and while, pressure on the main brake is building up, the drum is rotating relatively freely as compared with the maximum brake pressure obtained for the particular operation. Thus the frictional resistance to the unwinding of the line is reduced during the critical period while the drum is being accelerated, and when the brake becomes fully applied the discs 80 and 81 are still moving relatively to each other at a fixed and predetermined tangential force.

The knurled knob 105 may be adjusted to give a wide variation of characteristics. It will be understood that the various adjustments take care of variable conditions met in practice such as the amount of acceleration desired, the size of the line, the gross weight of glider and cargo.

Thus a pick-up system has been described which is efficient and reliable in operation. The restriction of the use of a plastic rope to the pick-up loop and lead line gives the desired amount of elongation for efficient operation. The use of steel cable wound on the drum permits putting a greater length of line upon a drum of smaller diameter, thus reducing weight and inertia of the drum. The slow recovery of the plastic rope eliminates all overshooting and rebound. The recovery of the plastic rope to its initial length is sufficiently rapid to permit use of the same ground loop and lead line within a few minutes thereafter for another pick-up operation.

The use of the particular winch construction simplifies the brake delay and maximum brake pressure adjustments, and it provides a wide range of adjustment. One construction based upon the present disclosure applies maximum braking forces from as little as 20 pounds to as much as 1500 pounds with different adjustments. Furthermore, the brake delay and maximum brake setting adjustments are independent of each other.

In addition to advantages of operation, numerous structural advantages are obtained. Convenient dial or other indicating markings are provided for both brake delay and brake pressure adjustments. The construction lends itself to the use of small ball bearings and relatively light and small structural parts. The multiple disc, main brake provides adequate braking area without dangerous overheating and permits a wide range of adjustments. The level wind permits winding a pick-up line back on to the drum in even layers while it may be conveniently cut out of operation when the line is unwound from the drum during the pick-up operation.

In addition, numerous safety devices are provided. The handle 180 on the motor brake permits manual release of this brake if the power should fail. If it be necessary to reel in the winch by hand, the hand ratchet 52 makes the manual reeling in of the winch possible. The ratchet 229 prevents all unwinding movement of the brake support during the pick-up operation even though the motor brake should fail. At the same time, this ratchet will not prevent reeling in the line by motor or by hand. The brake release cord 248 in Fig. 10 provides for the immediate cutting out of the main brake during the pick-up operation at any instant it is desired to reduce tension on the pick-up line 12. The initial drag is still present, however, and prevents any tendency to backlash. Furthermore, the special safety connection between the steel pick-up line 12 and the brake drum supplies adequate strength tangentially so that no matter how much tangential force is transmitted through the convolutions of the steel cable to the drum due to the inherent small snubbing action of steel cable, this safety device will not give way. If, however, the steel cable should become completely unwound, immediate release of the cable from the drum is obtained.

While certain novel features of the invention have been disclosed herein, and are pointed out in the annexed claims, it will be understood that various omissions, substitutions and changes may be made by those skilled in the art without departing from the spirit of the invention.

What is claimed is:

1. In an automatic winch for airplanes and the like, a frame, a rotatable support, a drum, a hollow shaft journaled on said frame and carrying said support and said drum, a main brake operating between said support and said drum, means operative upon rotation of said drum for gradually increasing the friction of said main brake, said hollow shaft having an abutment, a main spring seated against said abutment and extending axially of the shaft, a backing member having connection with said main brake for applying the pressure of said spring to said brake, said backing member having an annular groove, an expansible washer seated in said groove, a holding member retaining said washer in position, said expansible washer withstanding the thrust of said main spring, a safety control member, and means operated by said control member for moving said holding member to release said expansible washer and thereby to remove pressure from said main spring.

2. In an automatic winch for airplanes and the like, a frame, a rotatable support, a drum, a hollow shaft journaled on said frame carrying said support and said drum, a main brake operating between said support and said drum, means operative upon rotation of said drum for gradually increasing the friction of said main brake, said hollow shaft having an abutment, a main spring seated against said abutment and extending axially of the shaft, a rod passing through said main spring and having connection with said brake for applying the pressure of said spring to said brake, a sleeve surrounding and affixed to said rod and having an annular groove, an expansible spring washer seated in said groove, a holding sleeve having a seat retaining said washer in position, a holding spring operating between said holding sleeve and an abutment on said rod, a collar on said rod and seated against said washer against which said main spring also seats, a guide sleeve secured to said hollow shaft, a control sleeve slidable on said guide sleeve, a hand operated member secured to said control sleeve, movement of which causes said control sleeve to engage an abutment on said holder sleeve to move the latter against its holding spring to release said expansible washer and thereby to remove pressure from said main spring.

3. In a shock absorbing system, spaced supports, a hollow shaft journaled in said supports, a brake support secured to said hollow shaft, a drum journaled on said hollow shaft, brake engaging elements secured to said drum and to said brake support respectively, means for operating said brake engaging elements including radial fingers extending through openings in said hollow shaft, a brake applying assembly comprising a rod member extending through said hollow shaft and a sleeve member surrounding said rod, an adjusting connection between said rod and sleeve members, a main brake-applying spring applying pressure to one of said members, the other of said members being adapted to apply pressure to said fingers, a brake operating member having movement responsive to movement of said drum, said main spring acting to apply braking pressure to said fingers, and means whereby said brake operating member controls the position of said assembly with respect to said fingers.

4. In a shock absorbing system, spaced supports, a hollow shaft journaled in said supports, a brake support secured to said hollow shaft, a drum journaled on said hollow shaft, brake engaging elements secured to said drum and to said brake support respectively, means for operating said brake engaging elements including radial fingers extending through openings in said hollow shaft, a brake applying rod extending through said hollow shaft, a brake applying sleeve surrounding said rod and adapted to engage said fingers, said hollow shaft having an abutment, a main brake applying spring surrounding said rod on the opposite side of said fingers from said sleeve and disposed between said abutment and an abutment on said rod, an adjusting nut-and-thread connection between said sleeve and said rod for adjusting the distance between the remote ends of said sleeve and said rod, a brake operating member having movement responsive to movement of said drum, said main spring acting to apply braking pressure to said fingers, and means whereby said brake operating member controls the position of said sleeve with respect to said fingers.

5. In a system for launching an object to be towed through the air, a towing craft, an object to be towed having a substantially lower velocity, means for connecting said object and craft including an automatic winch on said towing craft and a line wound on said winch, said winch comprising a frame, a drum also journaled in said frame about a main axis, a countershaft journaled in said frame, drive means between said countershaft and said drum, a brake driving nut having screw thread engagement with said countershaft, braking devices between said frame and drum including a radial element, an axially extending operating element concentric with said main axis engaging said radial element, and means coacting with said brake operating nut and said axially extending operating element for moving said fingers to apply the brake.

6. In a system for launching an object to be towed through the air, a towing craft, an object to be towed having a substantially lower velocity, means for connecting said object and craft including an automatic winch and a line wound on said winch, said winch comprising a frame, a rotatable support journaled in said frame about a main axis, a drum also journaled in said frame about said main axis, a countershaft journaled in said frame about an axis other than said main axis, drive means between said countershaft and said drum, a brake operating nut having screw thread engagement with said countershaft, braking devices between said support and drum including radial fingers, an axially extending operating element concentric with said main axis engaging said fingers, and means coacting with said brake operating nut and said axially extending operating element for moving said fingers to apply the brake.

7. In a shock absorbing device, a frame, a brake support journaled on said frame, a drum journaled on said frame and having braking relation with said brake support, devices for controlling the said braking relation comprising a brake operating shaft journaled on said frame, means for rotating said shaft in response to rotation of said drum, said brake operating shaft having machine threads, a brake operating nut having machine threads engaging said shaft threads, a brake delay adjustment comprising a dial secured to said frame concentric with said brake operating shaft, a rotatable arm adjustable on said dial at various rotary positions, an abutment secured to said rotary arm, said nut having a cam surface facing said abutment whereby the rotary position of said arm determines the inner position of said brake-operating nut.

8. In a shock absorbing device, a frame, a brake support journaled on said frame, a drum journaled on said frame and having braking relation with said brake support, devices for controlling the said braking relation comprising a brake operating shaft journaled on said frame, means for rotating said shaft in response to rotation of said drum, said brake operating shaft having screw threads, a brake operating nut comprising an inner sleeve member having screw threads engaging said shaft threads and an outer sleeve member slidable on said inner sleeve member, a spring operating between said sleeve members, a brake operating lever fulcrumed to said frame and engaging said outer sleeve member to permit it to have axial movement but no rotary movement, a crank pivoted to said inner sleeve member and having a lug engageable between lugs on said outer sleeve member, and means for determining the initial position of said nut on said shaft.

9. In a shock absorbing device, a frame, a brake support journaled on said frame, a drum journaled on said frame and having braking relation with said brake support, devices for controlling the said braking relation comprising a brake operating shaft journaled on said frame, means for rotating said shaft in response to rotation of said drum, said brake operating shaft having screw threads, a brake operating nut comprising an inner sleeve member having screw threads engaging said shaft threads and an outer sleeve member slidable on said inner sleeve member, a spring operating between said sleeve members, a brake operating lever fulcrumed to said frame and engaging said outer sleeve member to permit it to have axial movement but no rotary movement, a crank pivoted to said inner sleeve member and having a lug engageable between lugs on said outer sleeve member, a time adjustment comprising a dial secured to said frame concentric with said brake operating shaft, a rotatable arm having a spring pressed pin engageable with openings in said dial at various rotary positions, an abutment secured to said rotary arm, said outer sleeve member having a cam surface facing said abutment whereby the rotary position of said arm determines the inner position of said brake-operating nut.

10. In a winch for an aircraft or the like, a frame comprising side pieces and a cross piece, main bearings in said side pieces, a rotatable support and a rotatable drum journaled in said main bearings, a line wound on said drum, a ring gear secured to said support, a motor drive, reduction gears connecting said motor drive and said ring gear, braking devices between said support and said drum, a motor brake associated with said motor, a shaft passing through said cross piece, adapted to be turned by a hand crank or the like, power transmitting elements connecting said end shaft and said ring gear, and a ratchet and pawl mechanism operating between said frame and support.

11. In a winch for an aircraft or the like, a frame comprising side pieces and a cross piece, a main shaft journaled in said side pieces, a rotatable support and a rotatable drum carried by said shaft, a line wound on said drum, a ring gear secured to said support, a motor drive casing secured to one of said side pieces adjacent said ring gear, a motor within said casing having an armature rotatable about an axis perpendicular to said main shaft, reduction gears connecting said armature and said ring gear, a main brake acting between said support and said drum, an electromagnetic motor brake associated with said motor, an auxiliary shaft passing through said frame cross piece adapted to be turned by a hand crank or the like, power transmitting elements connecting said auxiliary shaft and said ring gear, a ratchet comprising a pawl pivoted to said frame adapted to engage said ring gear, and means for locking said pawl out of engagement with said ring gear.

12. In a system for launching an object to be towed through the air, a towing craft, an object to be towed having a substantially lower velocity, means connecting said object to said craft including a line and a winch on said towing craft, said winch comprising a drum, a rotatable support having braking relationship with said drum, an electric motor driving said rotatable support, a motor frame, a motor brake acting between said motor shaft and motor frame, an electromagnet comprising a magnet coil and an armature, a spring acting normally to apply said motor brake, a handle for releasing said motor brake, the energizing of said electromagnet also releasing said motor brake.

13. In a system for launching an object to be towed through the air, a towing craft, an object to be towed having a substantially lower velocity, means connecting said object to said craft including a line and a winch, said winch comprising a drum, a rotatable support having braking relationship with said drum, an electric drive motor, reduction gearing between said drive motor and said rotatable support, a motor frame, a motor brake comprising a series of discs some of which are secured to the motor shaft and others being secured to the frame, a pressure plate for exerting pressure on said discs, an electromagnet comprising a magnet coil concentric with the motor shaft, a magnet circuit comprising a shell enclosing said magnet coil and having an outer wall and top and bottom walls, a tubular armature member connected to said pressure plate and movable axially within said coil and having close sliding relationship with the bottom wall of said magnetic circuit, said upper wall having a depending tubular extension adapted to form an air gap with said armature member, a non-magnetic sleeve secured within said armature, a spring acting between said frame and a shoulder on said sleeve, a handle having screw thread engagement with said frame and having a spindle passing through said spring and said sleeve, said spindle having an abutment engaging under said sleeve shoulder.

14. In a system for launching an object to be towed through the air, a towing craft, an object to be towed having a substantially lower velocity, means for establishing connection between said craft and said body comprising a winch and a line wound thereon, means for retarding unwinding of said winch, means for winding in said line, a level wind having a guide for said line for winding up said line on said winch in even layers, and means for disengaging said line and said guide when said line is unwinding from said winch.

15. In a shock absorbing system, spaced end frames, a main shaft journaled in said frames, a drum journaled on said main shaft, a brake support secured to said main shaft and having braking relationship with said drum, a gear secured to said drum within the adjacent end frame, a countershaft journaled in said adjacent end frame and having a first gear meshing said drum gear and an outer pinion, a level wind having first and second side arms pivoted to said end frames concentric with said countershaft, said level wind having a fixed tube connecting the arms thereof, a threaded drum member disposed within said tube and journaled in said drum, drive means connecting said countershaft and said threaded drum member, said tube having a traveler thereon, said traveler having a nose member engaging said threaded drum, said traveler having a depending open bottom guide, a line wound on said drum passing through said guide, means for locking the level wind in operative position, means for swinging said level wind about its pivot points to disengage said guide from said line.

16. In a shock absorbing system, spaced end frames, a main shaft journaled in said frames, a drum journaled on said main shaft, a brake support secured to said main shaft and having braking relationship with said drum, a gear secured to said drum within the adjacent end frame, a countershaft journaled in said adjacent end frame and having a first gear meshing said drum gear and an outer pinion, a level wind having first and second side arms pivoted to said end frames concentric with said countershaft, said level wind having a fixed tube connecting the arms thereof, a threaded drum member disposed within said tube and journaled in said arms and having a sprocket connected thereto on the outer side of said first arm, an intermediate shaft on said first arm having a gear meshing said countershaft pinion, said intermediate shaft also having a sprocket connected to its gear, a chain connecting said sprockets, said tube having a traveler thereon, said traveler having a nose member engaging said threaded drum, said traveler having depending stud shafts, rollers journaled on said stud shafts, a line wound on said drum passing between said rollers, means for locking the level wind in operative position, means for swinging said level wind about its pivot points to disengage said rollers from said line.

17. In a shock absorbing system, a winch comprising a frame having spaced bearings, a hollow main shaft journaled in said bearings, a brake support secured to said main shaft, a drum journaled on said main shaft, a plurality of brake discs secured to said drum, a plurality of brake discs secured to said support, said drum discs and said support discs being sandwiched together, radial fingers pivoted to said support for applying pressure to said sandwiched brake discs, a hub gear secured to said drum, a brake operating shaft journaled in said frame, a pinion secured to said shaft meshing said hub gear, a brake operating nut having screw thread engagement with said brake operating shaft, a fulcrum secured to said frame, a lever pivoted to said fulcrum and having pivotal connection with said brake operating nut, a spring assembly within said hollow main shaft comprising an axial member engageable with said fingers, said axial member having at its opposite end a pivotal connection with said lever, a spring acting between an abutment on said hollow shaft and said member to apply pressure to said fingers, means located on the axis of said main shaft for adjusting the tension of said spring applied to said brake fingers, an adjustable stop device secured to said frame for determining the inner position of said brake operating nut, and means for setting said brake operating nut to obtain delayed brake action.

18. In a shock absorbing device, a frame, a drum journaled on said frame and having braking relation with said frame, devices for controlling said braking relation comprising a brake operating shaft journaled on said frame, means for rotating said shaft in response to rotation of said drum, a brake operating nut comprising a first sleeve axially slidable with respect to said shaft, and a second sleeve having screw threads engaging shaft threads on said brake operating shaft and being rotatable with respect to said first sleeve, means for preventing rotation of said first sleeve, a crank secured to said second sleeve to rotate the same, and interlocking devices for preventing relative rotation between said sleeves.

19. In a system for launching an object to be towed through the air, a towing craft in flight, an object to be towed having a substantially lower velocity than said towing craft, means establishing connection between said towing craft and said object including a winch on said towing craft, a line, said winch comprising a frame, a drum journaled on said frame, said line being carried on said drum, braking devices automatically retarding unwinding of said line from said drum when force is applied to said line, and safety brake releasing means for instantly releasing said braking devices permitting said line to pay out freely.

20. In an automatic winch for airplanes and the like, a frame, a rotatable support journaled on said frame, a drum also journaled on said frame, a main brake acting between said support and said drum and operated by rotation of said drum, a line wound on said drum, means for braking said support whereby said main brake retards unwinding of said drum due to a load being applied to said line, and safety brake releasing means for instantly releasing said main brake and permitting said line to pay out freely.

21. In an automatic winch for airplanes and the like, a frame, a rotatable support journaled on said frame, a drum also journaled on said frame, a main brake acting between said support and said drum, said main brake comprising friction elements and a spring urging said elements together, a line wound on said drum, means for braking said support whereby said main brake retards unwinding of said drum due to a load being applied to said line, and safety brake releasing means for instantly releasing said main brake and permitting said line to pay out freely.

ARTHUR B. SCHULTZ.

REFERENCES CITED

The following references are of record in the file of this patent:

UNITED STATES PATENTS

| Number | Name | Date |
|---|---|---|
| 1,877,309 | Haseltine | Sept. 13, 1932 |
| 1,913,508 | Phillips | June 13, 1933 |
| 2,329,943 | Robins | Sept. 21, 1943 |
| 834,658 | Chanute | Oct. 20, 1906 |
| 1,459,884 | Goodin | June 26, 1923 |
| 1,794,828 | Bleriot | Mar. 3, 1931 |
| 2,122,766 | Wiemer | July 5, 1938 |
| 2,295,537 | Anderson | Sept. 15, 1942 |
| 1,112,331 | Sessions | Sept. 29, 1914 |
| 1,313,719 | Miller | Aug. 19, 1919 |
| 1,070,197 | Snell | Aug. 12, 1913 |
| 2,131,610 | Arndt | Sept. 27, 1938 |
| 2,373,413 | Plummer | Apr. 10, 1945 |
| 2,373,414 | Plummer | Apr. 10, 1945 |
| 1,875,467 | Knoerzer et al. | Sept. 6, 1932 |

FOREIGN PATENTS

| Number | Country | Date |
|---|---|---|
| 370,664 | Italy | Apr. 26, 1939 |

OTHER REFERENCES

Publication, "The Aeroplane," pages 552–555 of the issue of Nov. 15, 1940. An article by O. L. L. Fitzwilliams.